May 1, 1928. 1,668,086
P. ORZEL
APPARATUS FOR CUTTING AND RIVETING
Original Filed Sept. 30, 1922 2 Sheets-Sheet 2
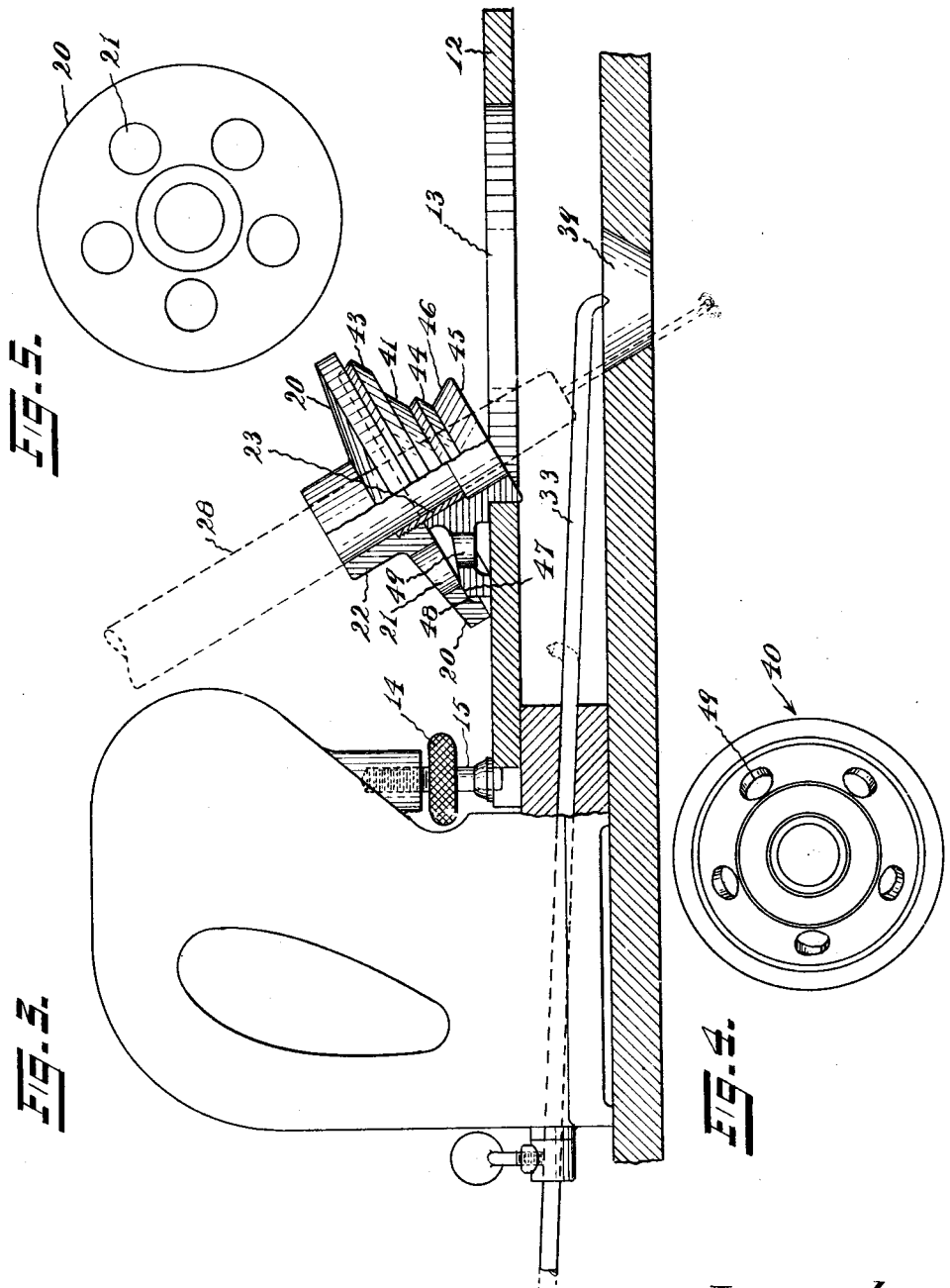
Witnesses:
Inventor:
Paul Orzel,
By his Att'y, Patented May 1, 1928.

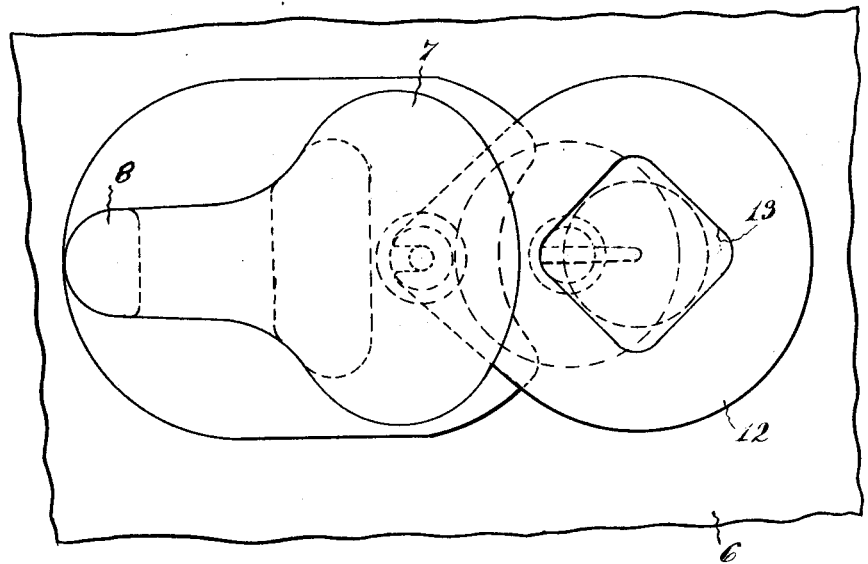
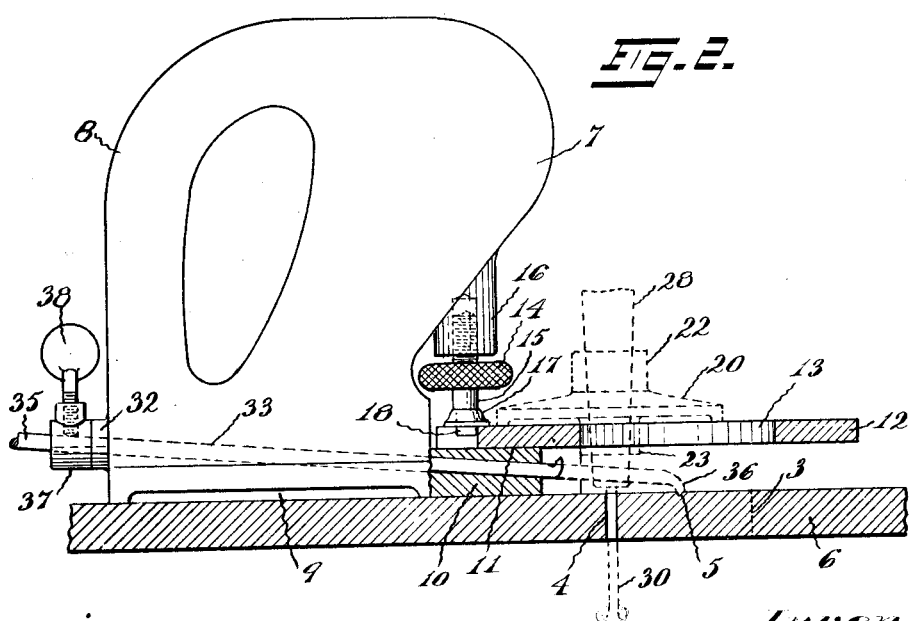

1,668,086

UNITED STATES PATENT OFFICE.

PAUL ORZEL, OF NEW YORK, N. Y.

APPARATUS FOR CUTTING AND RIVETING.

Application filed September 30, 1922, Serial No. 591,573. Renewed September 16, 1927.

The present invention relates to an improvement in method of cutting holes of desired form in steel and other metals and also for cutting metals to the desired shapes, by means of an oxy-acetylene torch, and has for its main purpose a provision of equipment consisting in templets or pattern or profile plates, a weighted holder therefor, and means cooperating with the profile plates and the nozzle of the burner whereby geometric or other cuts of any kind may be made in the steel plate or the like, according to the design upon the profile plate used.

An important advantage of my invention is the provision of means whereby the holes are cut under direct control of the pattern plate.

Another important advantage of my device is the provision of torch or burner holding means whereby bevelled edges may be cut or countersunk holes may be cut in the plates by reason of the provision of means whereby the torch flame may be inclined about the axis of the aperture to be cut.

Another advantage of my device is the provision of means carried on the torch nozzle whereby either vertical or inclined cuts may be made at will, the said means cooperating with a single type of profile plate for either vertical or angular operative positions.

Another advantage is the provision of improved means whereby the profile plate holder is readily positioned to cause the accompanying profile plate to be registered upon the desired point of cutting.

Another advantage in my device is due to the arrangement of the profile plate holder being weighted, so that while it is light enough to be moved manually to desired positions, it is still heavy enough not to be readily disturbed during the manipulation of the torch.

A special object is to provide improved means for interchangeably holding the templet or profile plate in proper spaced relation with the plate to be cut, so that the operator may make his selection of any one of a large number of templets having holes of various configuration.

Other objects of the invention will appear as the description proceeds; and while herein details of the invention are disclosed, the invention is not limited to these, since many and various changes may be made without departing from the scope of the invention as claimed.

In the accompanying drawings showing, by way of example, two of many possible embodiments of the invention, Figure 1 is a plan of the templet stand or support, showing a templet thereon, dotted lines showing the means for positioning the stand in place relative to the hole to be cut;

Fig. 2 is a side elevation, partly in longitudinal central vertical section through the apparatus, showing one form of torch holding means;

Fig. 3 is a similar view on an enlarged scale, showing an additional form of torch holding and guiding means; and Figs. 4 and 5 show plans of the two torch holding means.

My improved apparatus of Figs. 1 and 2 is shown in position for cutting an opening to be round as at 3 and 4 (Fig. 2), centered at the point 5 in a metal plate 6. The apparatus itself comprises a heavy combined handle and stand or support 7 provided with a hand hold 8 and adapted to rest on said plate 6, the stand 7 being heavy enough to hold its position during operation. The stand is undercut, as at 9, in its lower face to permit the stand to rest firmly on a plate having projections or foreign material thereon. The stand is provided with a forwardly projecting ledge 10 spaced a distance from the plate 6 to form a seat 11 for receiving one of any number of interchangeable templets or profile plates 12 (Figs. 1 and 2).

The templets 12 are adapted to rest on said seat 11, and are provided with a pattern opening 13, slightly larger than the opening to be cut. A clamping screw 15 carried in an interiorly threaded boss 16 is provided with a shoulder-collar 17 bearing against the templet and a reduced end 18 engaging in a recess 19, and is actuated by a milled wheel 14 (Fig. 2), to secure the templets to the ledge 10.

A face plate 20 ventilated with large holes 21 (Fig. 5) is adapted to rest on the templet and has a central hub 22 having a bore therethrough having an enlarged interiorly threaded lower end carrying a bushing 23 engageable with and guided by the edge of the pattern opening 13. A downwardly tapering burner or blow pipe 28 is secured in said bushing and the face plate holds the blow pipe perpendicular to the templet so that the flame 30 will cut the plate always the same horizontal distance from the guiding edge of the templet, thus cutting the hole centered at 5 substantially the same shape as the pattern opening 13 but smaller than the opening as indicated by the dotted line 3 (Fig. 2) and the solid line 4 showing the limits of the hole.

Means is provided for positioning the apparatus relative to the point 5 as will now be described. An extension boss 32 extends from the lower outer face of said stand 8, and an inclined bore 33 passing through said boss, stand and ledge 11 at the central vertical plane of the stand slidably receives an indicator rod 35 provided with a downwardly projecting pointer 36 at the inner end. An adjustable stop collar 37 held on the outer end of the rod by the set screw 38 is settable to stop the rod when the pointer 36 engages over the point 5 at the middle of the opening to be cut, thus indicating that the stand is set in proper position for commencing cutting. The set screw 38 in said boss 32 is adapted for holding the collar in any position of adjustment depending upon the size of the hole to be cut or the selected relation of the points to the hole.

The operation of the device as thus far described is as follows: The operator selects or has prepared a templet 12 of the desired shape and size and secures it to the stand 8 by means of the screw 15. He then pushes the rod 35 inwardly until the pointer 36 will indicate the position of the point 5, and then locks the collar 37 against the boss 32. The pointer 36 is then placed upon the point 5 of the metal plate 6 to be cut, thus locating the apparatus, whereupon the rod 25 is withdrawn to the position of the full lines of Fig. 2. The blow pipe having been already secured in the face plate as shown in Fig. 2, the face plate is placed face down upon the templet with the blow pipe projecting through the face plate, and the bushing 23 in contact with the edge of the hole 13. The blow pipe is then moved slowly around the edge of the templet, with the bushing in contact with said edge until the hole 5 is completely cut.

The rod 35 is then pushed inward to the position of the dotted lines of Fig. 2 and the above operation repeated for the next hole of the same kind.

For making bevelled cuts or countersunk holes 39 as in Fig. 3, the guide or holding means 40 of Figs. 3 and 4 is used in conjunction with the face plate 20, though it is noted that the invention is not so limited.

The guide 40 comprises a downwardly pointed flat truncated-cone-shaped ventilated member or portion provided with an intermediate ventilating groove 41 dividing said portion into contact faces 43 and 44 adapted to rest on said templet. A lower flaring central hub 45 joins said portion and is provided with a bore therethrough receiving the bushing 23 and has its peripheral face 46 inclined at an inclined angle to the axis of the burner and at a right angle to the contact faces 43 and 44 and engageable with the edge of the pattern opening 13. The guide 40 is made rigid with the face plate 20 and therefore the burner by close fit on the bushing 23 and contact of the beveled edge face 47 of the guide with the lower recessed face 48 of the face plate. The ventilating holes 49 serve to ventilate the groove 41 and lighten the weight of the guide.

The operation of the guide 40 is obvious from the foregoing. The faces 43, 44 and 46 of the guide must be held in firm contact with the inner face of the opening 13 and the top face of the templet respectively, with the line of contact of said faces in the same vertical plane, to give a constant inclination to the axis of the burner. The guide 40 is then slowly passed entirely around the opening 13 until the hole 39 is completed. The manipulation of the rod is the same as described of Fig. 2.

I claim:

1. In combination, a templet, means for supporting the templet over the work, a burner, means engageable with the surface of the templet adjacent to the pattern opening for providing support for the burner by the templet, and means cooperating between the first means and the templet for supporting the burner at an inclination to the plane of the templet.

2. In combination, a templet, means for supporting the templet over the work, a burner, means engageable with the surface of the templet adjacent to the pattern opening for providing support for the burner by the templet, and means cooperating between the first means and the edge of the pattern opening of the templet for supporting the burner at an inclination to the plane of the templet and by engagement of the second means with the edge of the pattern opening guiding the burner in its work.

3. In combination, a templet, means for supporting the templet over the work, a burner means engageable with the surface of the templet adjacent to the pattern opening for providing support for the burner by the templet, and means cooperating between the first means and the edge of the pattern opening for supporting the burner at an inclination to the plane of the templet and by engagement of the second means with the edge of the pattern opening guiding the burner in its work, the burner when in said inclined position passing through the first and second means and through the pattern opening.

4. In combination, a stand of substantially solid bulky mass construction for providing weight and supported by the work, a templet supported over the work by the stand, a burner, means engageable with the surface of the templet adjacent to the pattern opening for providing support for the burner by the templet, and means cooperating between the first means and the templet for supporting the burner at an inclination to the plane of the templet.

5. In combination, a stand of substantially solid bulky mass construction and supported by the work and having an extended base portion, a templet supported by the base extension over the work, a burner, means engageable with the surface of the templet adjacent to the pattern opening for providing support for the burner by the templet, and means cooperating between the first means and the templet for supporting the burner at an inclination to the plane of the templet, the burner when in said inclined position passing through the first means and the pattern opening of the templet.

6. In combination, a stand of substantially solid bulky mass construction and supported by the work and positionable thereon and having an extended base portion, a guiding rod passing through the lower portion of the stand and through the base extension for positioning the stand on the work, a templet supported over the work by said base extension, a burner, means engageable with the surface of the templet adjacent to the pattern opening for providing support for the burner by the templet, and means cooperating between the first means and the edge of the pattern opening of the templet for supporting the burner at an inclination to the plane of the templet and by engagement of the second means with the edge of the pattern opening guiding the burner in its work, the burner when in said inclined position passing through the first and second means and through the pattern opening.

7. In combination, a templet provided with an opening; a downwardly pointing burner passing through said opening; and a downwardly pointed truncated-cone-shaped face plate on the burner adapted to rest on said templet and supporting the burner in said opening at an angle to the templet.

8. In combination, a stand; a templet secured on said stand and provided with an opening; a downwardly pointing burner; and a downwardly pointed truncated-cone-shaped face plate having its lower face engageable with the top face of said templet and carrying the burner at an angle to the templet and having a lower hub having its peripheral face engageable with the edge face of the pattern opening.

9. In combination, a stand; a templet thereon provided with a pattern opening; a downwardly pointed truncated-cone-shaped face plate having its lower face engageable on the top face of said templet and having a lower flaring central hub having its peripheral face inclined at an angle to the axis of the face plate and at a right angle to the lower face plate and engageable with the inner edge face of the pattern opening; and a downwardly pointing blow pipe co-axially mounted in said face plate.

10. An apparatus for cutting openings in metal plates, said apparatus comprising, a stand adapted to rest on the plate; an interchangeable templet secured on said stand and provided with a pattern opening larger than the opening to be cut; a downwardly pointed flat truncated-cone-shaped ventilated face plate adapted to rest on said templet and having a lower flaring central hub having a bore therethrough having its peripheral face inclined at an angle to the axis of the face of the face plate and at a right angle to the lower face plate and engageable with the edge of the pattern opening; and a downwardly pointing blow pipe in said bore.

11. In combination, a templet; a downwardly pointing burner; an upper face plate carrying said burner and having one angle of active face; and a lower face plate adapted to rest on said templet and carrying the burner and having another angle of active face.

12. In combination, a templet; a downwardly pointing burner; an upper face plate engageable with the templet and having a hub carrying said burner and having an opening receiving the burner; and a truncated-cone-shaped face plate engaging the lower face of the upper face plate receiving the lower part of the burner.

13. In combination, a stand; a templet secured on said stand and provided with an opening; a downwardly pointing burner; a face plate having a hub carrying said burner and having a lower projecting bushing around the burner; and a downwardly pointed truncated-cone-shaped face plate adapted to rest on said templet and receiving said bushing and carrying the burner at an angle to the templet.

14. In combination, a templet stand having an inclined bore passing through said stand from front to rear near the bottom thereof; a templet secured on the front of said stand; a slide rod slidable in said bore and having an angularly turned pointer, and lock means adapted to engage said rod.

15. In combination, a templet stand having a front ledge, a rear extension boss, and an inclined bore passing through said boss, stand and ledge; a templet secured on the ledge and having an intra-marginal opening forming a guide edge; a slide rod slidable in said bore and having a downturned pointer positionable at the center of said opening; a collar on said rod and engageable with said boss; and a set screw in said boss and adapted to engage said rod.

16. In apparatus of the character described, in combination, a templet having a pattern opening; means for supporting the templet in superposed position over the work; a cutting torch passing through said pattern opening and supported by the templet; and means for maintaining the torch in the pattern opening at an inclination to the plane of the templet, said means being engageable with the edges of the pattern opening for guiding the torch in its work.

17. In apparatus of the character described, a stand positionable on the work for operation; means for guiding the stand for positioning the same on the work for operation; a templet supported by the stand in superposed position over the work and having a pattern opening; a cutting torch passing through said pattern opening and supported by the templet; and means for maintaining the torch in the pattern opening at an inclination to the plane of the templet, said means being engageable with the edges of the pattern opening for guiding the torch in its work.

18. In apparatus of the character described, a templet-supporting stand of substantially solid bulky mound-like mass construction for providing weight for maintaining the stand in operative position on a plate to be cut and having an extension at the base of the mound-like mass.

19. In apparatus of the character described, a templet-supporting stand of substantially solid bulky mass construction for providing weight for maintaining the stand in operative position on the work and having a base extension for supporting a templet over the work and having a guiding rod passing through the lower portion of the stand and through said extension and extending over the work and engageable therewith.

20. In combination, a templet; a burner; and means carried by the burner engageable with the templet for supporting the burner by the templet at an inclined angle to the templet.

21. In combination, a templet; a burner; and coned guide engageable with the templet and burner for guiding the burner at an inclined angle to the templet.

22. In combination, a templet; a burner; and a combined guide and flaring flame deflector adapted to rest on said templet and carry the burner.

23. In combination, a templet; a face plate adapted to rest on said templet and having a wide recess in its lower face forming a marginal bearing flange engageable with the templet; and a blow pipe carried by said face plate.

24. In combination, a templet; a face plate adapted to engage with said templet and having a wide shallow recess in its face forming a marginal bearing flange engageable with the templet, and ventilating openings communicating with said recess; and a blow pipe carried by said face plate.

25. In combination, a templet; a burner; an upper face plate disposed around said burner and having one kind of active face; and a lower face plate disposed around the burner and adapted to rest on said templet and having another kind of active face.

26. In combination, a templet; a burner; and a guide adapted to rest on said templet and comprising upper and lower plates having communicating ventilating openings.

27. In combination, a templet; a burner; superposed face plates disposed around said burner and adapted to rest on said templet and forming a recess therebetween and ventilating openings in said face plates and communicating with the recess.

28. In combination, a burner; a templet for guiding the burner; and a weighted stand carrying said templet at the lower part of the stand and heavy enough to retain the templet in position for operation on a plate to be cut, the main weighted portion of the stand being disposed substantially entirely above the level of the templet when horizontal.

29. In combination, a burner; a templet for guiding the burner; and a combined handle and stand carrying said templet at the lower part of the stand, the handle being disposed substantially entirely above the level of the templet when the latter is horizontal.

30. In combination, a burner; a templet for guiding the burner; and a combined handle and weighted stand carrying said templet near the lower part of the stand and heavy enough to retain the templet in position for operation on a piece to be cut, the handle and weighted portion of the stand being disposed substantially entirely above the templet; said weighted portion being mainly forward of the handle and partly over the templet.

31. In combination, a templet; a blow pipe guided thereby; and a stand supporting the templet in spaced relation with a work piece close enough to the work piece for the templet to serve as a slag deflector.

32. In combination, a stand; a templet; and means holding said templet on the stand permitting removal of said templet in the plane of the templet.

33. In combination, a stand; a templet; and means held against movement through the templet for clamping said templet on the stand.

34. In combination, a stand having a seat; a templet engaging on said seat and having a marginal notch; and clamping means engaging in said notch and pressing on said templet.

35. In combination, a stand having a seat and a bore; a templet engaging on said seat and having a marginal notch; and a screw in said bore engaging in said notch and pressing on said templet.

36. In combination, a templet support adapted to engage on a work piece to be cut; a templet thereon having a guiding edge; a blow pipe guided by said edge and pointed toward the plate and adapted to cut said work piece with its flame; a movable pointer; and means for guiding the pointer from and toward the work piece and into and out of the space between the work piece and templet.

37. In combination, a templet having a guiding edge; a blow pipe guided by said edge and adapted to cut a work piece with its flame; a slide rod slidably secured to said support for sliding movement at a slanting angle to the templet in the direction of the axis of the rod and retractible from the path of the flame and having an indicating end disposable adjacent to said piece.

38. In combination, a templet support adapted to engage on a work piece to be cut; a templet thereon having a guiding edge; a blow pipe guarded by said edge and adapted to cut said work piece with its flame; a slide rod rotatably and slidably secured to said support for sliding movement in the direction of the axis of the rod and retractible from the path of the flame and having an angularly timed indicating end disposable by rotative and sliding movement of the rod adjacent to said piece.

39. In combination, a templet support adapted to engage on a work piece to be cut; a templet thereon having a guiding edge; a blow pipe guided by said edge and adapted to cut said work piece with its flame; a slide rod movably secured to said support and retractible from the path of the flame and having an indicating end disposable adjacent to said piece; and adjustable means for adjustably limiting the movement of the pointer when said rod is moved toward the work piece.

40. In combination, a burner; a support; and means for guiding the burner at an inclined angle to a work piece in a closed path; said means including a pair of inter-engaging parts secured to said burner and support respectively; one part having a guiding face and a substantially closed guiding edge, the other part engaging said edge and face at an angle to the face.

41. In combination, a burner; a support; and means for guiding the burner at an inclined angle to a work piece, in a closed path less than twice the diameter of the burner; said means including a pair of inter-engaging parts secured to said burner and support respectively; one part having a guiding face and a closed guiding edge, the other part engaging said edge and face at an angle to the face.

42. In combination, a burner; a support; and means for guiding the burner at an inclined angle to a work piece, in a crooked path; said means including a pair of inter-engaging parts secured to said burner and support respectively; one part having a guiding face and a crooked edge, the other part engaging said edge and face at an angle to the face.

43. In combination, a burner; a support; and means for automatically guiding the burner at an inclined angle to a plate to be cut in a crooked non-arcuate path; said means including a pair of inter-engaging parts secured to said burner and support respectively; one part having a guiding face and a crooked non-arcuate guiding edge, the other part engaging said edge and face at an angle to the face and said plate.

PAUL ORZEL.